US010277049B1

(12) United States Patent
Fernandez-Mattos et al.

(10) Patent No.: US 10,277,049 B1
(45) Date of Patent: Apr. 30, 2019

(54) HOLD-UP CAPACITOR CHARGING USING FLY-BACK POWER SUPPLY

(71) Applicant: HAMILTON SUNDSTRAND CORPORATION, Charlotte, NC (US)

(72) Inventors: Rodrigo Fernandez-Mattos, Solihull (GB); Priya Kakarla Naga Lakshmi, Bangalore (IN); Sesh Mohan Rao, Bangalore (IN); Sridhar Katakam, Bangalore (IN); Somasekhar Valleru, Bangalore (IN); Shobhit Agrawal, Bangalore (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/889,249

(22) Filed: Feb. 6, 2018

(30) Foreign Application Priority Data

Dec. 12, 2017 (IN) .............................. 201711044598

(51) Int. Cl.
*H02J 7/00* (2006.01)
*H02M 3/335* (2006.01)
*H02M 3/07* (2006.01)
*H02J 7/34* (2006.01)

(52) U.S. Cl.
CPC ........... *H02J 7/0052* (2013.01); *H02M 3/073* (2013.01); *H02M 3/33507* (2013.01); *H02J 7/345* (2013.01); *H02J 2007/0059* (2013.01)

(58) Field of Classification Search
CPC ........ H02J 7/0052; H02J 7/345; H02M 3/073; H02M 3/33507
See application file for complete search history.

(56) References Cited

U.S. PATENT DOCUMENTS

| 7,558,093 | B1* | 7/2009 | Zheng | H02M 3/33515 363/21.12 |
| 2004/0156217 | A1* | 8/2004 | Phadke | H02M 3/33569 363/21.16 |
| 2005/0062434 | A1* | 3/2005 | Muramatsu | H05B 41/042 315/219 |
| 2010/0013548 | A1* | 1/2010 | Barrow | H02M 1/36 327/536 |
| 2011/0038179 | A1* | 2/2011 | Zhang | H02M 1/4225 363/15 |

(Continued)

*Primary Examiner* — Adolf D Berhane
*Assistant Examiner* — Bart Iliya
(74) *Attorney, Agent, or Firm* — Cantor Colburn LLP

(57) ABSTRACT

Aspects include a hold-up capacitor charging circuit for a power supply. The hold-up capacitor charging circuit includes a voltage boosting charge pump circuit with a hold-up capacitor electrically coupled to a voltage source. The hold-up capacitor charging circuit also includes a fly-back circuit. The fly-back circuit includes a transformer with a primary winding electrically coupled to the voltage source and a secondary winding electrically coupled to a load. A switch is electrically coupled to the primary winding and the voltage boosting charge pump circuit. A controller is operable to open and close the switch to control energy transfer from the primary winding to the secondary winding and charge the hold-up capacitor responsive to voltages of the voltage source, the voltage boosting charge pump circuit, and a reflected voltage of the secondary winding at the primary winding.

13 Claims, 6 Drawing Sheets

(56) References Cited

U.S. PATENT DOCUMENTS

| | | | |
|---|---|---|---|
| 2012/0049758 A1* | 3/2012 | Hwang | H05B 33/0815 |
| | | | 315/291 |
| 2014/0098573 A1* | 4/2014 | Pan | H02M 3/335 |
| | | | 363/16 |
| 2017/0279349 A1 | 9/2017 | Nork et al. | |
| 2018/0166989 A1* | 6/2018 | Oyama | H02M 1/36 |

* cited by examiner

HOLD-UP CAPACITOR CHARGING USING FLY-BACK POWER SUPPLY

CROSS-REFERENCE TO RELATED APPLICATION

This application claims the benefit of the IN Application No. 201711044598 filed Dec. 12, 2017, which is incorporated herein by reference in its entirety.

BACKGROUND

Embodiments of the present disclosure relate to electrical power systems, and more particularly, to hold-up capacitor charging using a fly-back power supply.

Various electronic products make use of a hold-up capacitor to store energy during normal power supply operating conditions. The stored energy is utilized to power up a system for certain duration of time, called the hold-up time, even after the power supply is turned off, either due to a failure condition or a dip in voltage due to overload, etc. During the hold-up time, critical parameter information regarding the status of an electronic unit can be communicated to a next higher level component in a system before the electronic unit shuts down. The hold-up time is proportional to the amount of energy stored in the hold-up capacitor.

To charge the hold-up capacitor, additional circuitry is typically used, such as an additional high-voltage secondary winding on a transformer with a higher voltage than a typical transformer winding along with rectification circuitry, such that the transformer includes at least three windings (e.g., a primary, a secondary, and a higher-voltage secondary). Other approaches include the addition of a boost converter to generate high voltage with an additional power supply circuit. A boost converter typically includes additional storage elements, such as an inductor, switching circuitry, filtering circuitry, and other components. However, these options result in increased size, power consumption, testing burden, and other such issues.

BRIEF DESCRIPTION

Disclosed is a hold-up capacitor charging circuit for a power supply. The hold-up capacitor charging circuit includes a voltage boosting charge pump circuit with a hold-up capacitor electrically coupled to a voltage source. The hold-up capacitor charging circuit also includes a fly-back circuit. The fly-back circuit includes a transformer with a primary winding electrically coupled to the voltage source and a secondary winding electrically coupled to a load. A switch is electrically coupled to the primary winding and the voltage boosting charge pump circuit. A controller is operable to open and close the switch to control energy transfer from the primary winding to the secondary winding and charge the hold-up capacitor responsive to voltages of the voltage source, the voltage boosting charge pump circuit, and a reflected voltage of the secondary winding at the primary winding.

In addition to one or more of the features described above, or as an alternative to any of the foregoing embodiments, further embodiments may include where the voltage boosting charge pump circuit includes a flying capacitor that is charged responsive to the voltage source when the switch is closed.

In addition to one or more of the features described above, or as an alternative to any of the foregoing embodiments, further embodiments may include where the flying capacitor is charged responsive to a fly-back pulse from the transformer when the switch is open.

In addition to one or more of the features described above, or as an alternative to any of the foregoing embodiments, further embodiments may include where the voltage boosting charge pump circuit includes a first diode electrically coupled to the voltage source and the flying capacitor and a second diode electrically coupled between the first diode and the hold-up capacitor.

In addition to one or more of the features described above, or as an alternative to any of the foregoing embodiments, further embodiments may include a current limiting resistor electrically coupled between the second diode and the hold-up capacitor.

In addition to one or more of the features described above, or as an alternative to any of the foregoing embodiments, further embodiments may include where the voltage boosting charge pump circuit is operable as a voltage doubling circuit with respect to the voltage source.

In addition to one or more of the features described above, or as an alternative to any of the foregoing embodiments, further embodiments may include where the controller is a pulse width modulation controller operable to output a sequence of pulses to open and close the switch based on determining that the voltage source exceeds a minimum control voltage.

In addition to one or more of the features described above, or as an alternative to any of the foregoing embodiments, further embodiments may include where the switch is a metal-oxide semiconductor field effect transistor.

In addition to one or more of the features described above, or as an alternative to any of the foregoing embodiments, further embodiments may include where the hold-up capacitor is operable to supply power to the voltage source based on a reduction in voltage at the voltage source.

Also disclosed is a method for hold-up capacitor charging using a fly-back power supply. The method includes monitoring a voltage of a voltage source. A switch of a fly-back circuit is controlled to transition between an open state and a closed state based on determining that the voltage of the voltage source exceeds a minimum control voltage. A voltage boosting charge pump circuit is charged, and energy is stored in a primary winding of a transformer of the fly-back circuit based on the controller setting the switch to the closed state. The energy stored in the primary winding is transferred to a secondary winding of the transformer to power a load, and a hold-up capacitor is charged responsive to voltages of the voltage source, the voltage boosting charge pump circuit, and a reflected voltage of the secondary winding at the primary winding based on the controller setting the switch to the open state.

In addition to one or more of the features described above, or as an alternative to any of the foregoing embodiments, further embodiments may include providing an initial charging current from the voltage source to the hold-up capacitor prior to closing the switch.

In addition to one or more of the features described above, or as an alternative to any of the foregoing embodiments, further embodiments may include supplying power from the hold-up capacitor to the voltage source based on a reduction in voltage at the voltage source.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

In applications using a fly-back power supply for generating local on-board power supplies, there can be many components that add to system complexity, weight, and size, such as inductors, custom multi-winding transformer, filters, controllers, and the like. When a system requires some type of hold-up circuitry to store energy to be used during a hold-up period, the inclusion of complex additional circuitry for hold-up can add to the overall system complexity, size, and weight. For example, typical hold-up circuitry uses at least two switches that enable a power supply to supply electrical power to both a system load and a hold-up driving & control circuit. In a hold-up condition (e.g., a loss or reduction in voltage output from the power supply), one of the switches can be opened to allow the hold-up driving & control circuit to supply electrical power to the system load. Embodiments reduce the need for additional complex circuitry of a boost converter or an additional winding with rectifier/filter circuit components to charge a hold-up capacitor. For instance, customized magnetics can be avoided as compared to the greater complexities of a multi-winding transformer (e.g., two or more secondary windings).

Embodiments provide circuitry where a hold-up capacitor is charged using an existing on-board fly-back power supply. In order to boost the charging voltage beyond the input supply voltage, embodiments can make use of few discrete components without using additional complex circuitry. In a capacitor, such as a hold-up capacitor, energy (E) stored is proportional to capacitance (C) and voltage (V) squared to which the capacitor is charged as $E=0.5*C*V^2$.

To increase the energy stored in a hold-up capacitor, it can be beneficial to increase the voltage supplied to the hold-up capacitor beyond the voltage supplied directly by a voltage source. In some embodiments, a voltage boosting charge pump circuit, such as a one-level voltage doubling circuit can be included which generates a voltage of $2*V_{in}$, where $V_{in}$ is the applied input voltage from a voltage source. To further increase voltage, a secondary reflected voltage from a fly-back circuit can also be used in combination with the voltage boosting charge pump circuit, where the secondary reflected voltage on a primary winding and may be expressed as $V_O*(N_{pri}/N_{sec})$, where $V_O$ is the secondary voltage, $N_{sec}$ is the number of secondary turns, $N_{pri}$ is the number of primary turns. Additionally, voltage of the primary winding of a fly-back circuit can also be used to charge the hold-up capacitor. Various examples of hold-up capacitor charging circuits are further described herein.

Figure 1:
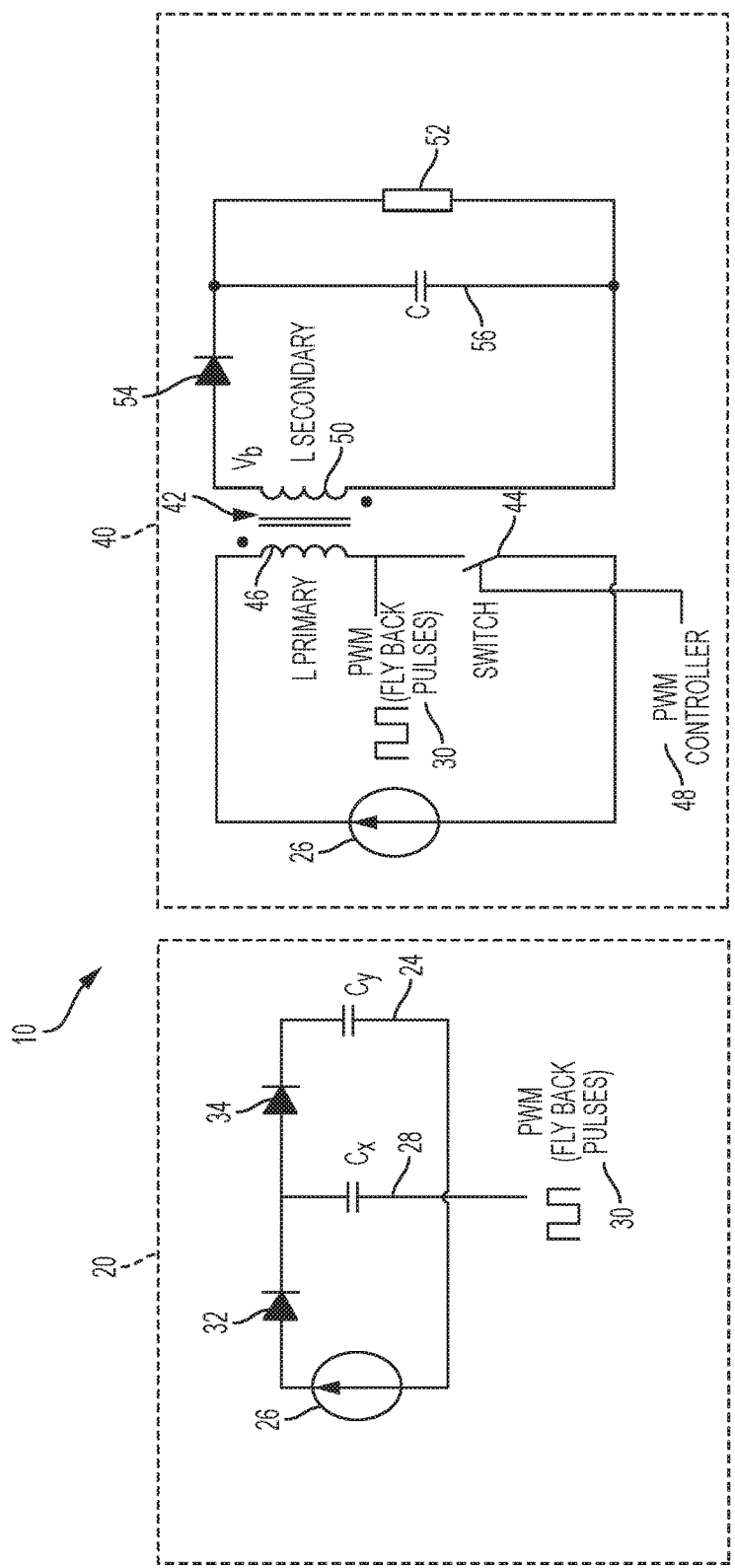
FIG. 1 is a schematic view of a voltage hold-up charging circuit in accordance with an embodiment of the disclosure.

Turning to the figures, FIG. 1 depicts a hold-up capacitor charging circuit 10 including a voltage boosting charge pump circuit 20 and a fly-back circuit 40. The voltage boosting charge pump circuit 20 selectively charges a hold-up capacitor 24 electrically coupled to a voltage source 26. The voltage boosting charge pump circuit 20 includes a flying capacitor 28 that is selectively charged and discharged responsive to fly-back pulses 30 produced by a transformer 42 of the fly-back circuit 40. The voltage boosting charge pump circuit 20 can include a first diode 32 electrically coupled to the voltage source 26 and the flying capacitor 28. The voltage boosting charge pump circuit 20 can also include a second diode 34 electrically coupled between the first diode 32 and the hold-up capacitor 24. The first and second diodes 32, 34 can be used to control the direction of current flow in various operating conditions. For instance, the hold-up capacitor 24 can be initially charged to a voltage of the voltage source 26 less voltage drops through the first and second diodes 32, 34. The flying capacitor 28 can be charged to the voltage of the voltage source 26 less a voltage drop through the first diode 32. Under certain operating conditions with respect to the fly-back circuit 40 and responsive to the fly-back pulses 30, the voltage provided to the hold-up capacitor 24 is effectively doubled based on the voltage of the voltage source 26 in series with voltage of the flying capacitor 28.

The fly-back circuit 40 includes a switch 44 electrically coupled to the voltage source 26 and a primary winding 46 of the transformer 42. The switch 44 is also electrically coupled to the voltage boosting charge pump circuit 20, where fly-back pulses 30 are produced responsive to a controller 48 changing the open/closed state of the switch 44, for instance, using pulse width modulation. The transformer 42 also includes a secondary winding 50 electrically coupled to a load 52. A diode 54 may be in series with the load 52, and a capacitor 56 can be in parallel with the load 52.

In embodiments, the controller 48 is operable to open and close the switch 44 to control energy transfer from the primary winding 46 to the secondary winding 50 and charge the hold-up capacitor 24 responsive to voltages of the voltage source 26, the voltage boosting charge pump circuit 20, and a reflected voltage of the secondary winding 50 at the primary winding 46. Control logic of the controller 48 can be implemented by analog circuitry, executable instructions and/or digital circuitry, such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

The controller 48 can output a sequence of pulses (e.g., pulse width modulated pulses) to open and close the switch 44 based on determining that the voltage source 26 exceeds a minimum control voltage. The controller 48 controls an output voltage of the secondary winding 50 for the load 52.

As a by-product, a train of fly-back pulses 30 is generated between the primary winding 46 and the switch 44 based on a reflected voltage from the secondary winding 50. The voltage level of the fly-back pulses 30 can be equal to the input voltage of the voltage source 26 plus the reflected voltage from the secondary winding 50.

Embodiments harvest the fly-back pulses 30, for example, by combining the fly-back pulses 30 with the voltage boosting charge pump circuit 20. By combining the train of fly-back pulses 30 generated in the fly-back circuit 40 and the voltage boosting charge pump circuit 20, the voltage across the hold-up capacitor 24 can be boosted to a higher voltage level (e.g., input voltage of the voltage source 26 times two plus the reflected voltage, which is substantially equal to the input voltage of the voltage source 26 plus the voltage level of the fly-back pulses 30).

Figure 2:
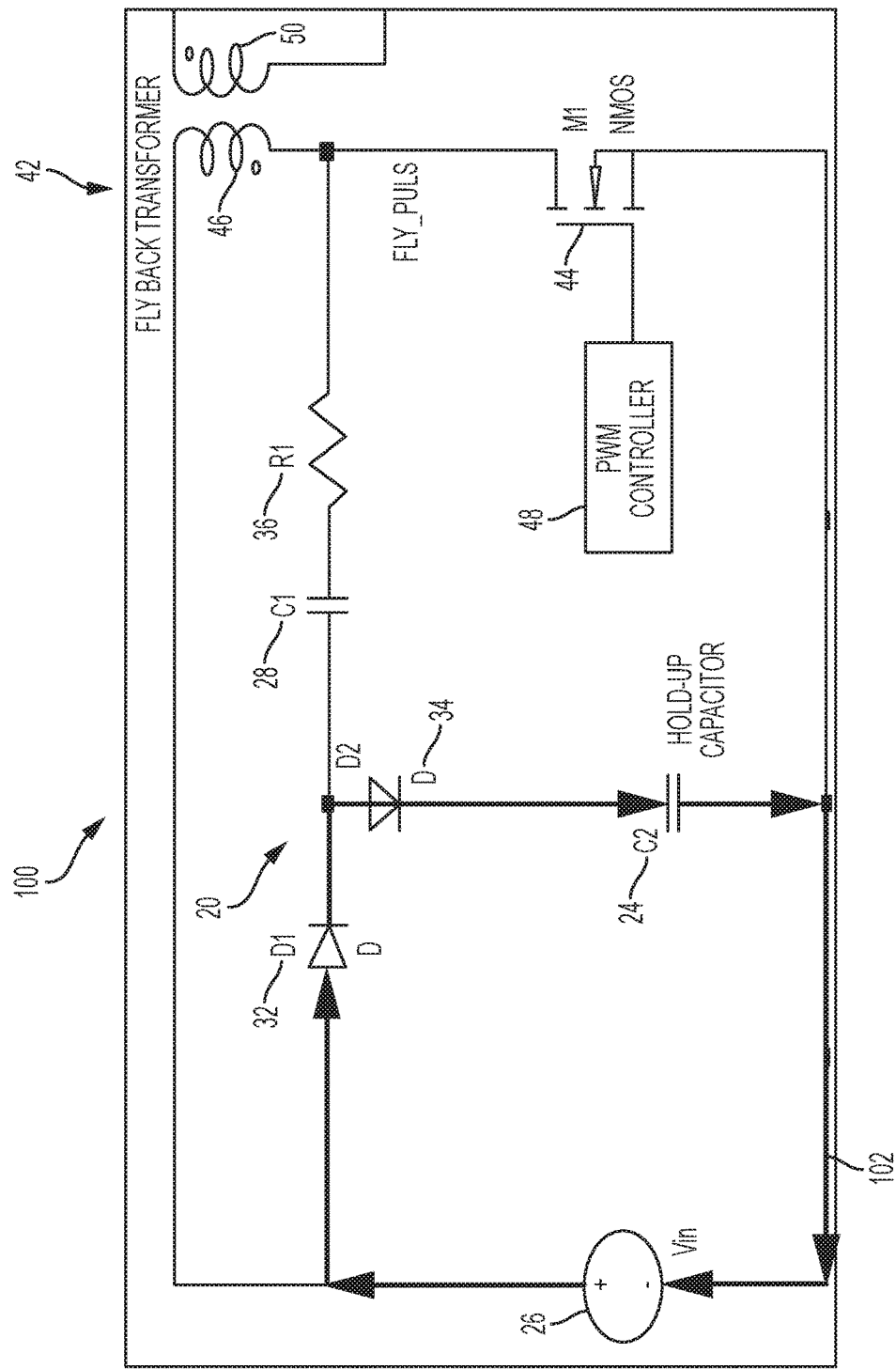
FIG. 2 is a schematic view of a first current flow path through a portion of a voltage hold-up charging circuit in accordance with an embodiment of the disclosure.

FIG. 2 depicts a hold-up capacitor charging circuit 100 illustrating many of the same components as previously described with respect to the hold-up capacitor charging circuit 10 of FIG. 1. The hold-up capacitor charging circuit 100 also includes a resistor 36 electrically coupled between the primary winding 46 and the flying capacitor 28. The example of FIG. 2 depicts the switch 44 as a metal-oxide semiconductor field effect transistor (M1 NMOS); however, other types of switching elements are contemplated. FIG. 2 illustrates that once an input voltage (Vin) is applied as the voltage source 26, current flows in a first current path 102 through the first diode 32 and the hold-up capacitor 24, initially charging the hold-up capacitor 24 to Vin−2*Diode Drop (of first diode 32 and second diode 34).

Figure 3:
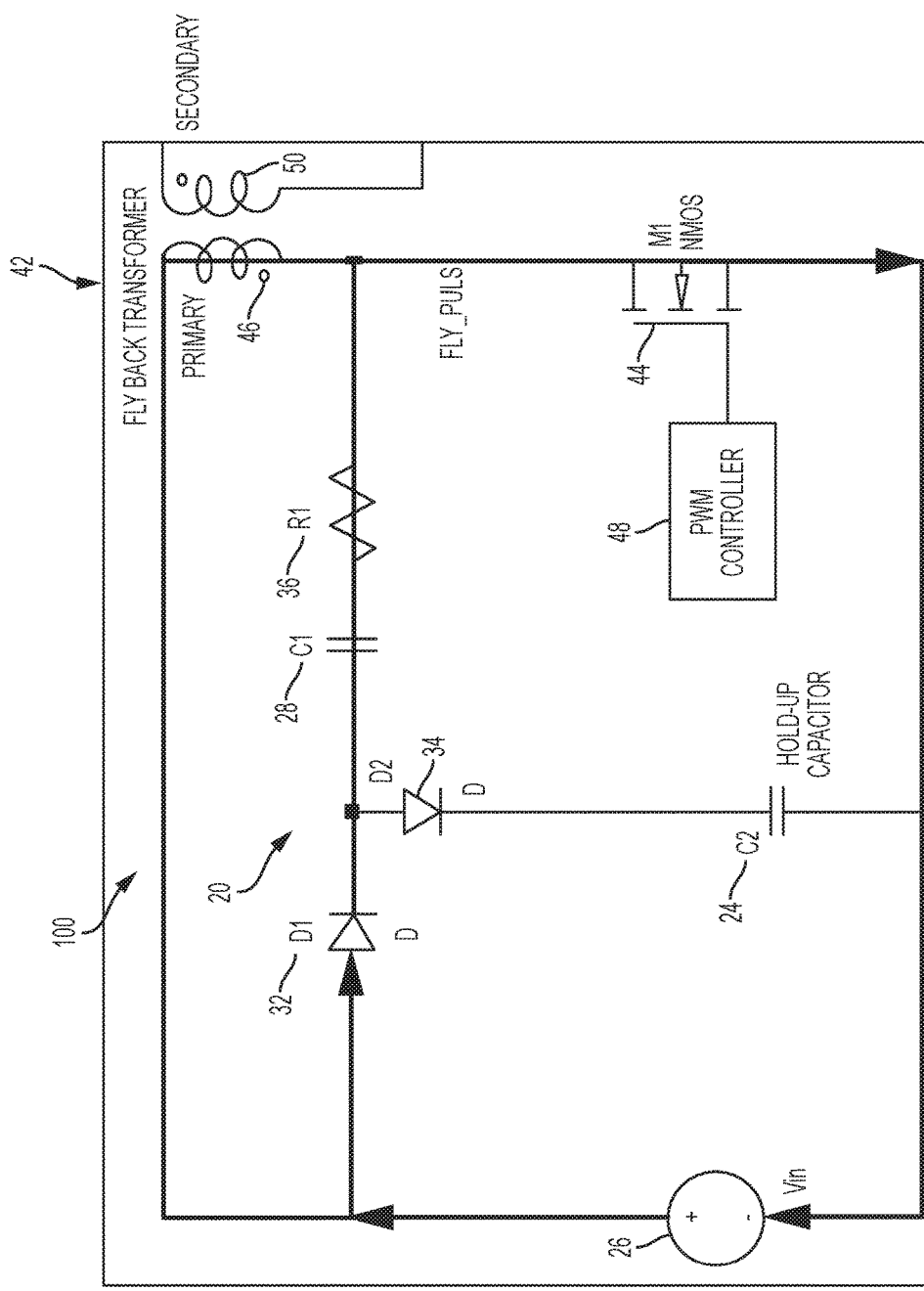
FIG. 3 is a schematic view of a second current flow path through a portion of a voltage hold-up charging circuit in accordance with an embodiment of the disclosure.

Once Vin exceeds a minimum control voltage, the controller 48 drives the switch 44. When the switch 44 is in a closed state (e.g., ON), currents from Vin flow through the flying capacitor 28 and through primary winding 46 of the transformer 42 as depicted in a second current path 104 of FIG. 3, charging the flying capacitor 28 to a voltage Vin−Diode Drop (of first diode 32) and storing energy in the primary winding 46 of the transformer 42 of fly-back circuit 40.

Figure 4:
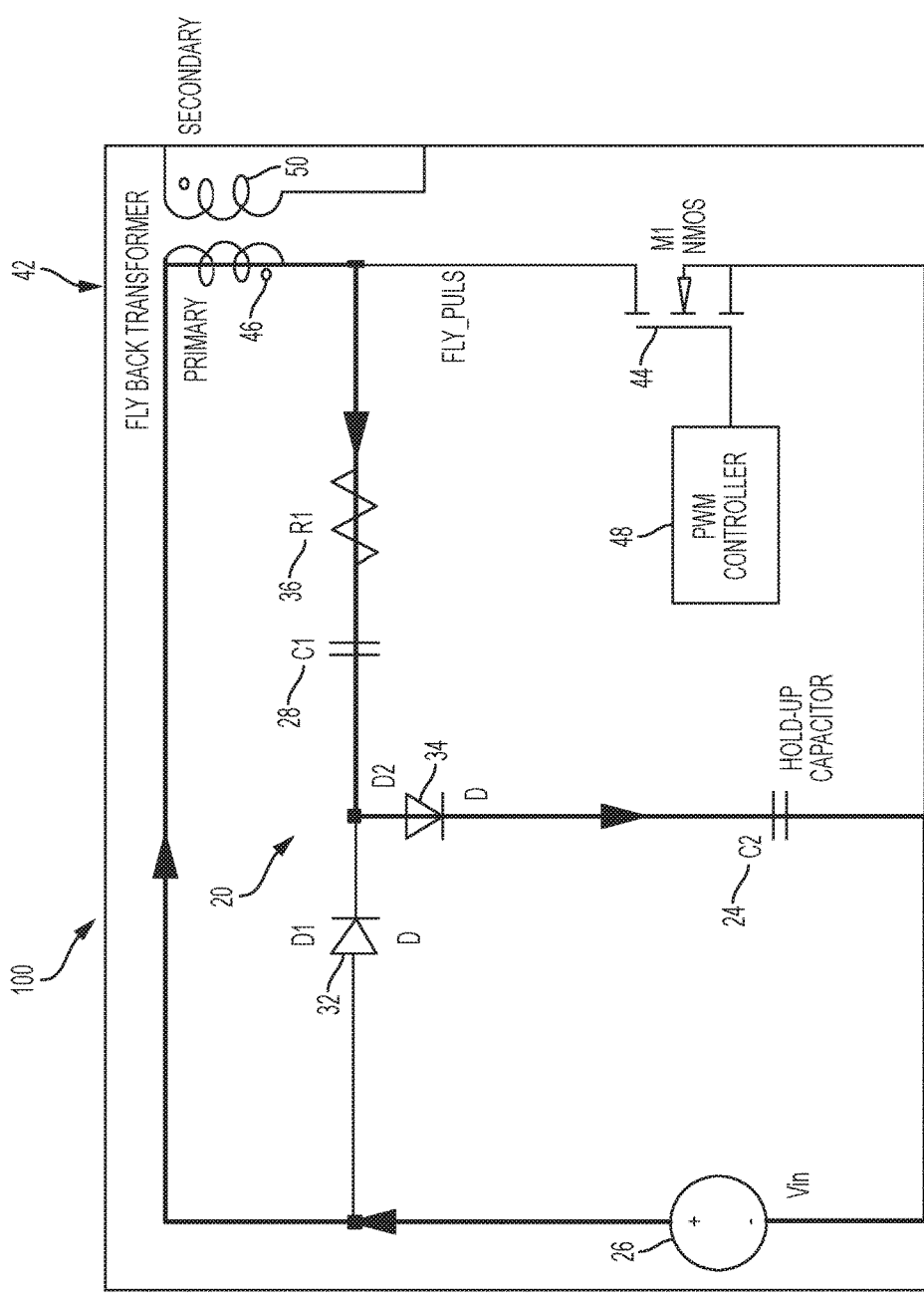
FIG. 4 is a schematic view of a third current flow path through a portion of a voltage hold-up charging circuit in accordance with an embodiment of the disclosure.

When the controller 48 toggles the switch 44 to an open state (e.g., OFF), the energy stored in primary winding 46 is transferred to the secondary winding 50. The voltage across the primary winding 46 is the reflected voltage from secondary winding 50. During OFF time of the switch 44, the input voltage (Vin) from voltage source 26, the secondary reflected primary voltage and voltage stored in flying capacitor 28 are added together since they are connected in series and applied across the hold-up capacitor 24. This boosts voltage across the hold-up capacitor 24, as depicted in the third current path 106 of FIG. 4. The cycle repeats for every OFF-ON (open/closed) cycle of the switch 44.

The voltage obtained at each step is explained through equations below:

$$V(C2)_{initial} = Vin - 2*\text{Drop Voltage} \quad \text{Step 1:}$$

$$V(C1)_{initial} = Vin - \text{Drop Voltage} \quad \text{Step 2:}$$

$V(\text{reflected}) = V0*(Np/Ns)$, where $Ns$ and $Np$ are the number of turns in secondary winding 50 and primary winding 46 of transformer 42, and $V0$ is the output of the secondary winding 50 (e.g., based on the fly-back design). Step 3:

$$V(C1) = V(C1)_{initial} + V(\text{reflected}) + Vin$$

$$V(C2) = V(C2)_{initial} + V(C1) - V(C2)_{initial} - \text{Drop Voltage}$$

Cancelling $V(C2)_{initial}$ and substituting $V(C1)$, from equations in above steps;

$$V(C2) = V(C1)_{initial} + V(\text{reflected}) + Vin - \text{Drop Voltage}$$

Substituting values for $V(C1)_{initial}$ from equations in above steps;

$$V(C2) = Vin - \text{Drop Voltage} + V(\text{reflected}) + Vin - \text{Drop Voltage}$$

$$V(C2) = 2*Vin + V(\text{reflected}) - 2*\text{Drop Voltage}$$

The Drop Voltage can include various losses due to series diode drops, DC resistance of the transformer 42, resistance of the switch 44, and/or other factors.

Table 1 provides examples of results from an embodiment with a turns ratio of 1.5:1 to produce a regulated output of 15 volts. Notably the voltage at hold-up capacitor 24 greatly exceeds the input voltage at the voltage source 26.

TABLE 1

Example results of hold-up capacitor voltages

| Input | | Output | Holdup | |
|---|---|---|---|---|
| V (V) | I (A) | V (V) | V Holdup Test (V) | V Holdup Calc (V) |
| 18 | 0.83 | 15.12 | 53.95 | 54.5 |
| 28 | 0.594 | 15.142 | 74.3 | 74.5 |
| 32 | 0.54 | 15.154 | 82.05 | 82.5 |

Figure 5:
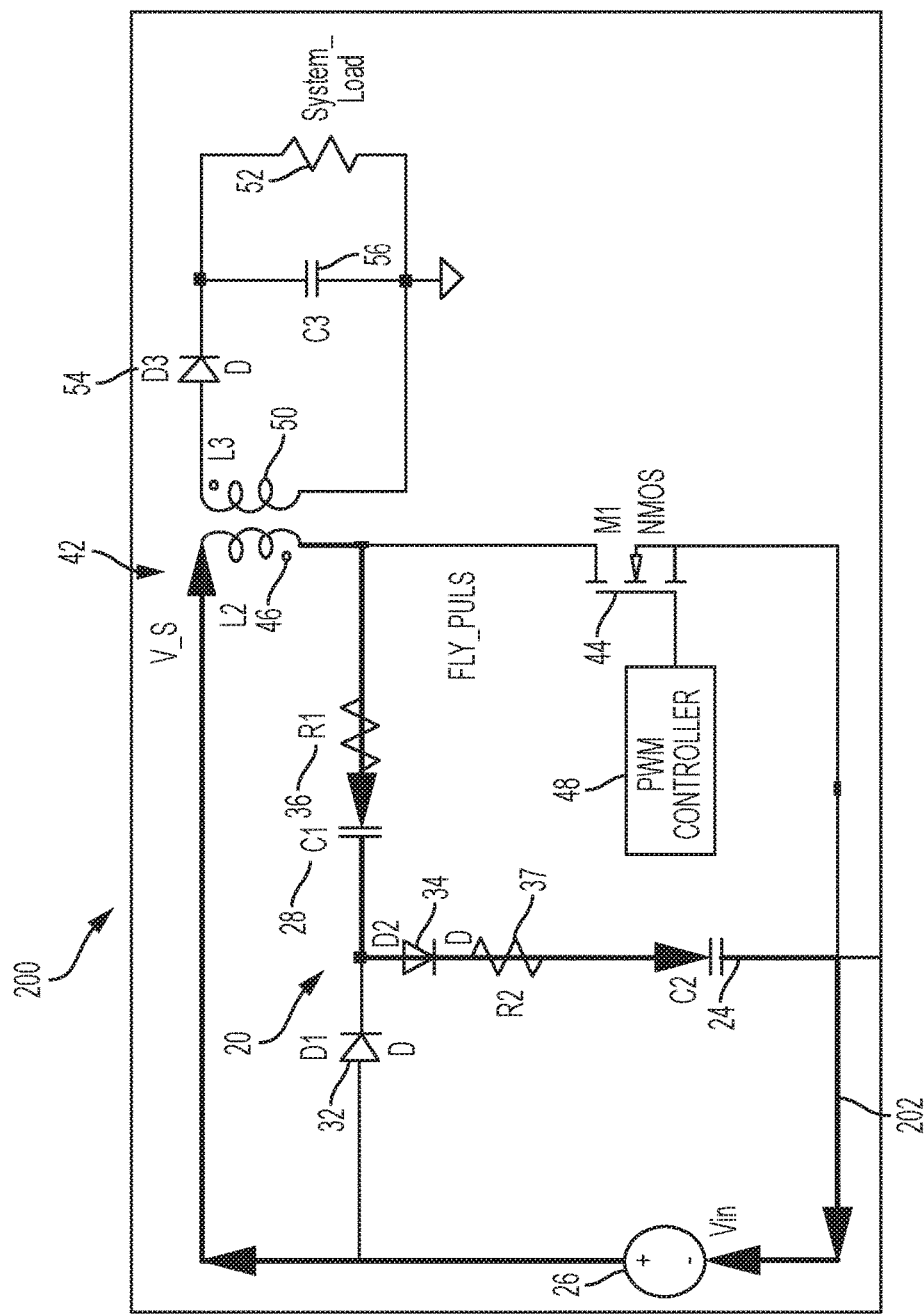
FIG. 5 is a schematic view of a current flow path through a portion of a voltage hold-up charging circuit in accordance with an embodiment of the disclosure.

Additional components can be included in some embodiments. For instance, in the example of hold-up capacitor charging circuit 200 of FIG. 5 with similar elements as previously described in reference to hold-up capacitor charging circuits 10 and 100 of FIGS. 1-4, a current limiting resistor 37 can be electrically coupled between the second diode 34 and the hold-up capacitor 24 in a current path 202. The hold-up capacitor charging circuit 200 may also include a hold-up loading resistor 39 electrically coupled in parallel with the hold-up capacitor 24. The combination of the current limiting resistor 37, hold-up capacitor 24, and hold-up loading resistor 39 can filter high frequency components that may result from leakage current of the primary winding 46, and thus prevents high frequency components (e.g., in MHz) from impacting the hold-up voltage at the hold-up capacitor 24.

Figure 6:
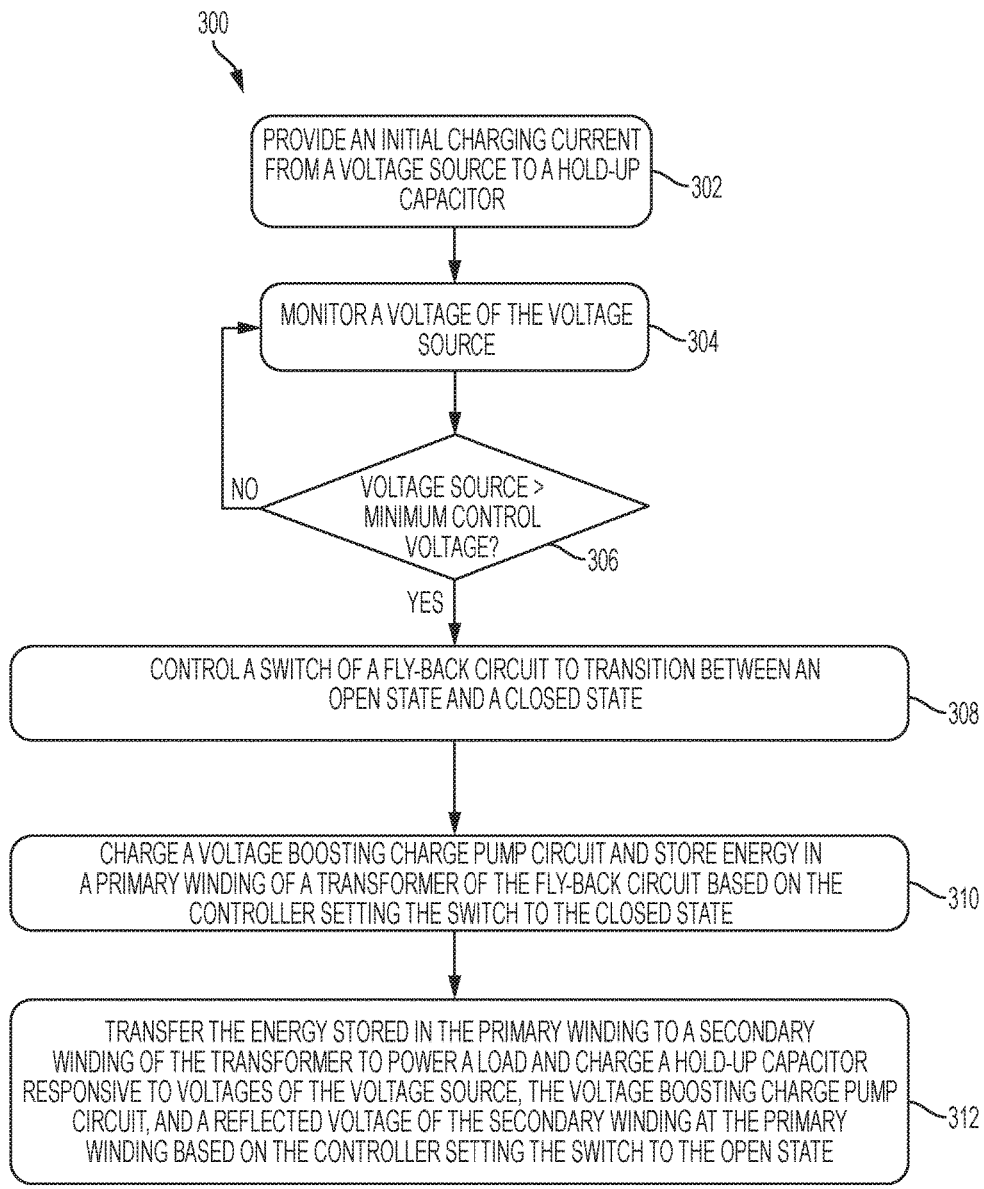
FIG. 6 is a process flow of a method in accordance with an embodiment of the disclosure.

FIG. 6 depicts a process 300 for hold-up capacitor charging and is described in reference to FIGS. 1-6. At block 302, an initial charging current is provided from the voltage source 26 to the hold-up capacitor 24 prior to closing the switch 44 (e.g., first current path 102). At block 304, the controller 48 monitors a voltage of the voltage source 26. At block 306, the controller 48 determines whether the voltage of the voltage source 26 exceeds a minimum control voltage. If the voltage of the voltage source 26 does not exceed the minimum control voltage, then the controller 48 continues monitoring the voltage source 26. At block 308, a switch 44 of fly-back circuit 40 is controlled to transition between an open state and a closed state based on determining that the voltage of the voltage source 26 exceeds a minimum control voltage. At block 310, voltage boosting charge pump circuit 20 is charged and energy is stored in a primary winding 46 of transformer 42 of the fly-back circuit 40 based on the controller 48 setting the switch 44 to the closed state (e.g., second current path 104). At block 312, the energy stored in the primary winding 46 is transferred to secondary winding 50 of the transformer 42 to power a load 52 and charge the hold-up capacitor 24 responsive to voltages of the voltage source 26, the voltage boosting charge pump circuit 20, and a reflected voltage of the secondary winding 50 at the primary winding 46 based on the controller 48 setting the switch 44 to the open state (e.g., third current path 106). In embodiments, power is supplied from the hold-up capacitor 24 to the voltage source 26 based on a reduction in voltage at the voltage source 26, such as a voltage drop or power loss.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hold-up capacitor charging circuit comprising: a voltage boosting charge pump circuit comprising;
    a hold-up capacitor electrically coupled to a voltage source;
    a flying capacitor;
    a first diode electrically coupled to the voltage source and the flying capacitor; and
    a second diode electrically coupled between the first diode and the hold-up capacitor; and
    a fly-back circuit comprising:
        a transformer comprising a primary winding electrically coupled to the voltage source and a secondary winding electrically coupled to a load, wherein the primary winding is electrically coupled to the flying capacitor;
        a switch electrically coupled to the primary winding and the voltage boosting charge pump circuit; and
        a controller operable to open and close the switch to control energy transfer from the primary winding to the secondary winding and charge the hold-up capacitor responsive to voltages of the voltage source, the voltage boosting charge pump circuit, and a reflected voltage of the secondary winding at the primary winding, wherein the flying capacitor is charged responsive to the voltage source when the switch is closed and the hold-up capacitor voltage is boosted responsive to a fly-back pulse from the transformer when the switch is open, via the flying capacitor.

2. The hold-up capacitor charging circuit of claim 1, further comprising a current limiting resistor electrically coupled between the second diode and the hold-up capacitor.

3. The hold-up capacitor charging circuit of claim 1, wherein the voltage boosting charge pump circuit is operable as a voltage doubling circuit with respect to the voltage source.

4. The hold-up capacitor charging circuit of claim 1, wherein the controller is a pulse width modulation controller operable to output a sequence of pulses to open and close the switch based on determining that the voltage source exceeds a minimum control voltage.

5. The hold-up capacitor charging circuit of claim 1, wherein the switch is a metal-oxide semiconductor field effect transistor.

6. The hold-up capacitor charging circuit of claim 1, wherein the hold-up capacitor is operable to supply power to the voltage source based on a reduction in voltage at the voltage source.

7. A method comprising:
    monitoring a voltage of a voltage source;
    controlling a switch of a fly-back circuit to transition between an open state and a closed state based on determining that the voltage of the voltage source exceeds a minimum control voltage;
    charging a voltage boosting charge pump circuit and storing energy in a primary winding of a transformer of the fly-back circuit based on the controller setting the switch to the closed state, wherein the voltage boosting charge pump circuit comprises:
        a flying capacitor that is charged responsive to the voltage source when the switch is closed, wherein the primary winding is electrically coupled to the flying capacitor;
        a first diode electrically coupled to the voltage source and the flying capacitor; and
        a second diode electrically coupled between the first diode and a hold-up capacitor;
    charging the hold-up capacitor responsive to a fly-back pulse from the transformer when the switch is open; and
    transferring the energy stored in the primary winding to a secondary winding of the transformer to power a load and charging the hold-up capacitor responsive to voltages of the voltage source, the voltage boosting charge pump circuit, and a reflected voltage of the secondary winding at the primary winding based on the controller setting the switch to the open state.

8. The method of claim 7, further comprising providing an initial charging current from the voltage source to the hold-up capacitor prior to closing the switch.

9. The method of claim 7, wherein a current limiting resistor is electrically coupled between the second diode and the hold-up capacitor.

10. The method of claim 7, wherein the voltage boosting charge pump circuit is operable as a voltage doubling circuit with respect to the voltage source.

11. The method of claim 7, wherein the controller is a pulse width modulation controller operable to output a sequence of pulses to open and close the switch.

12. The method of claim 7, wherein the switch is a metal-oxide semiconductor field effect transistor.

13. The method of claim 7, further comprising:
supplying power from the hold-up capacitor to the voltage source based on a reduction in voltage at the voltage source.

* * * * *